(12) United States Patent
Krishna et al.

(10) Patent No.: US 12,278,831 B2
(45) Date of Patent: Apr. 15, 2025

(54) SYSTEM AND METHOD FOR REAL TIME DISTRIBUTED ADAPTIVE CUBE AGGREGATION, HEURISTICS BASED HIERARCHICAL CLUSTERING AND ANOMALY DETECTION FRAMEWORK FOR HIGH VOLUME STREAMING DATASETS

(71) Applicant: Pelatro Pte. Ltd., Singapore (SG)

(72) Inventors: Arun Kumar Krishna, Bangalore (IN); Pramod Konandur Prabhakar, Bangalore (IN)

(73) Assignee: PELATRO PTE. LTD., Singapore (SG)

( * ) Notice: Subject to any disclaimer, the term of this patent is extended or adjusted under 35 U.S.C. 154(b) by 237 days.

(21) Appl. No.: 18/148,594

(22) Filed: Dec. 30, 2022

(65) Prior Publication Data

US 2023/0216874 A1    Jul. 6, 2023

Related U.S. Application Data

(60) Provisional application No. 63/295,084, filed on Dec. 30, 2021.

(51) Int. Cl.
*H04L 9/40*  (2022.01)
*G06F 16/22*  (2019.01)
*G06F 16/2455*  (2019.01)

(52) U.S. Cl.
CPC ...... *H04L 63/1425* (2013.01); *G06F 16/2264* (2019.01); *G06F 16/24556* (2019.01); *G06F 16/24568* (2019.01)

(58) Field of Classification Search
CPC ......... G06F 16/24568; G06F 16/24556; G06F 16/2264; H04L 63/1425

(Continued)

(56) References Cited

U.S. PATENT DOCUMENTS 7,869,658 B2    1/2011   Blose et al.
8,768,349 B1 *  7/2014   Dhanoa .................. H04W 8/18
                                                   455/433

(Continued)

FOREIGN PATENT DOCUMENTS

WO    2018160177    9/2018

OTHER PUBLICATIONS

Nielsen, Frank, "8 Hierarchical Clustering", Introduction to HPC with MPI for Data Science, Springer, 2016, pp. 195-211, ISBN 978-3-319-21903-5.

(Continued)

*Primary Examiner* — Dant B Shaifer Harriman
(74) *Attorney, Agent, or Firm* — Richard C. Piercy, Esq.; Mathew L. Grell, Esq.; Grell & Watson Patent Attorneys LLC

(57) ABSTRACT

A system for efficiently parsing semi-structured deep packet inspection traffic data tied to a telecommunications entity. The system comprises a computing device having access to a user activity data source and is configured to progressively accumulate a plurality of incoming usage activity data into a plurality of hypercubes, classify streaming data on-the-fly into multiple grades, route it to an appropriate next stage of processing, numerically factorize it to enable drilldown to individual subscriber data, and organize into layouts for efficient data processing, anomaly detection, and subsequent access/investigation. A computerized method for performing the same.

18 Claims, 11 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 9,503,585 | B2* | 11/2016 | Baldwin | H04W 12/12 |
| 9,913,128 | B2* | 3/2018 | Rajasekar | H04L 65/1063 |
| 11,450,419 | B1* | 9/2022 | Esman | G16H 20/13 |
| 11,630,848 | B2* | 4/2023 | Satoor | G06F 16/2458 |
| | | | | 707/600 |
| 11,663,219 | B1* | 5/2023 | Profirovic | G06F 16/2457 |
| | | | | 707/713 |
| 11,809,460 | B1* | 11/2023 | Rausch | G06F 16/287 |
| 11,841,851 | B1* | 12/2023 | Rausch | G06F 16/2428 |
| 12,141,183 | B2* | 11/2024 | Pal | G06F 16/328 |
| 2002/0198882 | A1 | 12/2002 | Linden et al. | |
| 2004/0260671 | A1* | 12/2004 | Potter | G06F 16/283 |
| 2008/0228764 | A1* | 9/2008 | Soogoor | G06F 16/901 |
| | | | | 707/999.005 |
| 2012/0330924 | A1* | 12/2012 | Rajan | G06F 16/2453 |
| | | | | 707/718 |
| 2014/0279824 | A1 | 9/2014 | Tamayo | |
| 2014/0344933 | A1* | 11/2014 | Huh | H04L 63/0428 |
| | | | | 726/23 |
| 2017/0070523 | A1* | 3/2017 | Bailey | G06F 16/285 |
| 2017/0134957 | A1* | 5/2017 | Gupta | H04W 12/128 |
| 2017/0177636 | A1* | 6/2017 | Nguyen | G06F 16/2264 |
| 2022/0012266 | A1* | 1/2022 | Gudmundson | G06F 16/2264 |
| 2022/0321704 | A1* | 10/2022 | Liu | H04W 24/08 |
| 2023/0216874 | A1* | 7/2023 | Krishna | H04L 63/1425 |

OTHER PUBLICATIONS

Herr, Dominik et al., "Visual Clutter Reduction through Hierarchy-based Projection of High-dimensional Labeled Data", 2016. pp. 109-116.

Schubert, Erich, "HACAM: Hierarchical Agglomerative Clustering Around Medoids—and its Limitations", LWDA 2021: Lernen, Wissen, Daten, Analysen Sep. 1-3, 2021, Munich, Germany, 14 pages.

Jin, Jungha et al., 3D Cube Algorithm for the Key Generation Method:Applying Deep Neural Network Learning-Based, Digital Object Identifier IEEE 10.1109/ACCESS.2020.2973695, 1 page.

* cited by examiner

| | | Speed Class | | | | | | |
|---|---|---|---|---|---|---|---|---|
| | | A | B | C | D | E | F | NA |
| Application Type | All | 466GB 8.19K | 488GB 13.39K | 5.00TB 216.69K | 32.28TB 1.29M | 27.49TB 1.71M | 48.13TB 5.02M | 1.07TB 4.64M |
| | YouTube | 203GB 3.00K | 239GB 4.96K | 2.59TB 88.23K | 16.04TB 415.18K | 11.25TB 483.19K | 11.30TB 2.02M | 359GB 1.33M |
| | Social Media | 14GB 793 | 16GB 1.78K | 311GB 70.23K | 5.11TB 634.24K | 7.09TB 791.63K | 14.50TB 3.75M | 202GB 2.46M |
| | WhatsApp | - 25 | - 75 | 12GB 1.53K | 75GB 14.47K | 290GB 29.90K | 312GB 742.41K | 3GB 572.92K |
| | Clash Games | - - | - 2 | - 111 | 4GB 2.05K | 2GB 2.78K | 5GB 18.82K | - 11.71K |
| | Instagram | - 51 | - 66 | 6GB 1.68K | 83GB 15.37K | 132GB 20.33K | 340GB 1.04K | 2GB 115.75K |
| | Clash Royale | - - | - 2 | - 108 | 2GB 288 | - 131 | 14.14TB 3.73M | - 867 |
| | Facebook | 13GB 742 | 16GB 1.72K | 304GB 69.00K | 5.02TB 627.51K | 6.95TB 782.69K | 14.14TB 3.73M | 198GB 2.42M |
| | Clash of Clans | - - | - - | - 3 | 2GB 1.76K | 1GB 2.65K | 3GB 17.86K | - 10.90K |

Fig. 7

SYSTEM AND METHOD FOR REAL TIME DISTRIBUTED ADAPTIVE CUBE AGGREGATION, HEURISTICS BASED HIERARCHICAL CLUSTERING AND ANOMALY DETECTION FRAMEWORK FOR HIGH VOLUME STREAMING DATASETS

CROSS-REFERENCE TO RELATED APPLICATIONS

To the full extent permitted by law, the present United States Non-provisional Patent Application hereby claims priority to and the full benefit of, United States Provisional Application entitled "Real time distributed adaptive cube aggregation, heuristics based hierarchical clustering and anomaly detection framework for telecom grade streaming datasets (Contextual Dashboards [CDB])," having assigned Ser. No. 63/295,084, filed on Dec. 30, 2021, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to electric digital data processing, namely methods or arrangements for processing data by operating upon the order or content of the data handled. More particularly, the instant disclosure relates to sorting and processing of high-volume incoming data into machine-readable algorithmic formats which can be quickly transmitted, analyzed and acted upon.

The instant disclosure is not limited to any particular data type, business use, industry, operating system, or implementation.

Description of the Related Art

Most large businesses have a large volume of customers or subscribers. In many industries where subscribers digitally interact with the business, a large volume of subscribers may generate an exponentially larger volume of data over time, especially given advances in connectivity and processing speeds and evolution in how subscribers consume content and services from businesses. To accommodate the large volume of data associated with transactions related to their customers or subscribers, businesses may use one or more data stores sufficient to store a large volume of data concerning their customers or subscribers, their customers' or subscribers' activity or purchases, and other relevant data about their customers or subscribers. These data stores may be "mined" from time to time in order to gain useful business intelligence/analysis/observations, which in turn may inform business decisions. For instance, day-to-day interactions and transactions may be recorded or collected, stored, processed, managed, or used to generate insights about the customers or subscribers, which may be acted upon to offer new opportunities for both the business and its customers. These data stores may often be repositories of information and data (i.e., databases) by which business and marketing operations may base their actions upon. Additionally, these data stores may be queried in order to find a particular customer or group of customers with one or more of a particular set of attributes. For instance, an accounts receivable department may need to obtain from its data store or data stores a list of subscribers whose invoice date falls on a particular day in the month and who have chosen to be automatically invoiced by credit card or ACH. In another instance, a marketing department may need to obtain from its data store a list of subscribers who have been a customer of the business for more than a specific number of years in order to reward those customers for their length of patronage. Additionally, automatic systems may be implemented to generate their own assessments of data, based on any number of criteria which may be important to the interaction of the business and its customers. In yet another instance, a marketing department in a wireless telecommunications company may wish to automatically identify particular classes or behaviors of subscriber sub-populations in order to increase its subscription or top-up revenue, thereby generating lists of customers for whom certain marketing offers may be highly relevant to those various specific classes or behaviors. However, since this data is often assembled onto databases over time, efficiencies in both processing and storage may diminish overtime, causing performance/stability problems when accessing the database, storing new information to the database, or processing data related to information stored on the database. Furthermore, performing analysis on data saved to a database may have the drawback of having access later than when the need of access (to data, analysis, reporting, etc.) is greatest, because it requires the information first be received, transmitted, processed for storage, and written to a storage device. Therefore, access to business-critical information and subsequent analysis of such information in real time may be difficult when requiring analysis of interaction information on data saved to a database.

In general, such data may be stored and even analyzed using an Enterprise Resource Planning (ERP) system or platform. Over the years, ERP systems and platforms have evolved to either include or interface with various business platforms such as Customer Relationship Managers (CRMs), subscriber usage monitors, accounting software, distribution platforms, and business intelligence solutions. The data store and corresponding ERP system or platform may function as a transactional system, as online transaction processing databases, as an operational database management system, as a distributed database system offering similar functionality, and/or a combination of the like, whereby the transaction itself may be performed utilizing the ERP system or platform and the resulting data need not be stored on, recorded on, or otherwise copied to or from a separate a centralized data store. The data store and corresponding ERP system or platform may often but not always be stored in a relational database or table on a server connected to a network. Additionally, incoming data may be first stored in memory, the organization and transfer of which may be important to the speed at which automatic systems may store, analyze, report, and/or act upon incoming data. Furthermore, it may be processed and condensed using compression algorithms before being transmitted to machines for further processing.

When implemented in such a way, a central data store or distributed data stores from which the ERP system or platform operates may not receive, store, or be able to timely process relevant data in order to communicate business-relevant offers or alerts to its customers, such that by the time such an offer reaches its customer, it is already too late for the business or the customer to benefit. To address this concern, organizations may increase or improve the bandwidth, processing power, or other known technologies within their incoming data management and processing system. Obvious tradeoffs to such decisions exist and are known in the art to include expense of equipment and cost of powering and maintaining said equipment. Other means may be rule-based or AI-assisted data handling and/or indexing of incoming data in order to better organize data during storage such that it can be more quickly accessed later. However, certain data observations relevant to subscription use may only occur or be relevant in real-time or near-real-time such that by the time the data is stored, it may no longer be relevant to the business and/or subscriber. This is especially of concern because any data observation about subscribers which is acted upon late, may be considered wasteful, resource-wise. Often, instead of generating and distributing these offers based upon a datastore and analysis thereof, large companies processing large volumes of subscriber-related data may instead base these analyses upon data as it arrives.

One such method of handling incoming data quickly, upon receipt and/or incoming transmission, is Deep packet inspection (DPI). DPI is a technique used to examine the contents of network packets as they pass through a network. It allows network administrators to inspect and analyze the data contained within the packets, including the source and destination addresses, protocol type, and payload data. It is a form of packet filtering that locates, identifies, classifies and reroutes or blocks packets with specific data or code payloads that conventional packet filtering, which examines only packet headers, cannot detect. Usually performed as part of a firewall defense, DPI functions at the application layer of the Open Systems Interconnection (OSI) reference model. Deep packet inspection examines the contents of packets passing through a given checkpoint and makes real-time decisions depending on what a packet contains and based on rules assigned by an enterprise, an internet service provider (ISP) or a network manager. DPI can be performed at different layers of the network stack, depending on the specific goals and requirements of the system. For example, DPI at the network layer (layer 3) may allow administrators to analyze the routing and addressing information contained within the packets, while DPI at the transport layer (layer 4) may allow them to examine the packet headers and payload data. More granularly, DPI at the application layer (layer 7) may allow administrators to inspect the specific application data contained within the packets, such as HTTP headers, emails, and file transfers. Previous forms of packet filtering only looked at packet header information, which is analogous to reading an address printed on an envelope without any knowledge of the contents of the envelope. This was due partly to the limitations of older technology. Until recently, firewalls and other network security/management systems did not have the processing power necessary to perform deeper inspections on large volumes of traffic in real-time. Technological advancements have enabled DPI to perform more advanced inspections so that it can check both packet headers and the underlying data therein.

In some uses, DPI can examine the contents of a message and identify the specific application or service that sent it. In addition, filters can be programmed to look for and reroute network traffic from a specific Internet Protocol address range or a certain online service, such as FACEBOOK® or TWITTER®. However, rarely is DPI used to inspect business/subscriber-relevant data in order to determine business opportunities to increase the utility/relevance of the subscription to the subscriber and the profitability of the business. Furthermore, DPI may be difficult to assess quickly in many current systems and the data contained therein may be therefore wasted, when they may instead provide insights into anomalies on a given network and provide tools to investigate such anomalies and prevent their recurrence. For instance, a quality of service issue related to a particular streaming service in a particular area might not be noticed if DPI data is not continually monitored and assessed in order to discover such an occurrence. In many cases, this may be due to concerns related to privacy and security, as it involves the inspection of potentially sensitive data. As a result, it is important for administrators to carefully consider the risks and benefits of how they leverage useful tools to analyze DPI-related data in their network, especially when developing techniques to enable as close as possible to subscriber-level business information while protecting subscriber privacy. Therefore, a system which possesses the capability of monitoring DPI for anomalies and/or trends in real time, without requiring immediate access to the underlying sensitive user-specific data, but while maintaining the capability of doing so upon discovery of such an anomaly is an important tool lacking in the state of the art.

The instant disclosure is designed to address at least some aspects of the problems discussed above. The system and method for real time distributed adaptive cube aggregation, heuristics based hierarchical clustering and anomaly detection framework for high volume streaming datasets described herein may be designed to replace or work alongside other various data processing systems, machines, computing devices, networks, the like and/or combinations thereof. Use of the system and method for real time distributed adaptive cube aggregation, heuristics based hierarchical clustering and anomaly detection framework for high volume streaming datasets described herein may help overcome many of the limitations of the systems and methods described above.

SUMMARY

Briefly described, in a possibly preferred embodiment, the present disclosure overcomes the above-mentioned disadvantages and meets the recognized need for such a system and method in order to efficiently parse semi-structured Deep Packet Inspection (DPI) traffic tied to an entity at million-records-per-second scale by using a system and method for real time distributed adaptive cube aggregation, heuristics based hierarchical clustering and anomaly detection framework for high volume streaming datasets.

In order to describe a potentially preferred embodiment of the disclosed system and method for real time distributed adaptive cube aggregation, heuristics based hierarchical clustering and anomaly detection framework for high volume streaming datasets, it may be helpful to simplify the system and method into a small subscriber set having a limited number of attributes, then applying this framework to a much larger set of subscribers having a much larger number of attributes may be more easily comprehended, as will be discussed in great detail in the Detailed Description.

Then, applying these data processing strategies, examples of their efficiencies in large, high DPI volume subscriber bases will be described in greater detail and should become recognizable to one having ordinary skill in the art. In summary, the disclosed system may include (a) progressive accumulation of high throughput data (e.g., DPI data) and processing into efficiently stored and analyzed formats, (b) classification of high throughput streams and aggregating them based on priority, (c) anomaly detection for network events (e.g., usage spikes, Quality of Service issues), (d) continual numerical factorization of real time data and (e) efficient storage layouts in memory, for processing, for transmission and on a database.

In one aspect, the disclosure may include steps or an instruction for a computer, upon receipt of an incoming DPI data stream or other receipt of high-volume data, to segregate incoming data attributes into three main groups based on their rate of change (e.g., volatile, semi-volatile and non-volatile) and use this information in real time to decision on the subsequent stages of aggregation.

In another aspect, the disclosure may include steps or an instruction for a computer to, upon segregation of the incoming high-volume data, aggregate iteratively by starting with smaller pre-formatted counters that gradually evolve to larger layouts in order to efficiently utilize available memory and in order to lower data transfer needs.

In yet another aspect, the disclosure may include steps or an instruction for a computer to, in addition to, separately, or after the segregation of incoming high-volume data, generate real time geometrical/algorithmic formulations and/or representations of streaming data at scale and make them available for business consumption over a GUI with drill down capabilities and resolution all the way down to individual subscribers.

By implementing such a system and method for real time distributed adaptive cube aggregation, heuristics based hierarchical clustering and anomaly detection framework for high volume streaming datasets, the ability to detect anomalies in data traffic or patterns at certain locations or for certain traffic types and notify the business users of the same in real time may be achieved.

Further important, by holistically packaging a series of easily performed computer instructions, which may be foolproof/proven techniques that do not require high-performance processing capabilities or generate potential for errors within the data stored or during processing, any number of software tools may be developed to provide an integrated module for determining and informing any number of tangible business use cases. Such a business tool may come in the form of a contextual dashboard GUI with subscriber-resolution visibility to business users at scale, which can be developed to facilitate proactive measures/actions, reactive analytical processing capabilities, and event investigational tools for such tangible business use cases.

By implementing the above systems, methods, and processes in high-scale data receipt environments, many benefits may be achieved as will be recognized by those skilled in the art. Example benefits may be limitless, but may include specific concrete examples such as enabling the segregation of incoming datasets on the fly into various buckets which are thereafter subjected to an aggregation technique that best suits the corresponding data volumes and inherent traits thus adapting to the nature of incoming data, all the while organizing data in an efficient manner by eliminating redundant information. Another feature of the disclosed system and method for real time distributed adaptive cube aggregation, heuristics based hierarchical clustering and anomaly detection framework for high volume streaming datasets may be its ability to construct and maintain global subscriber data structures differently from individual subscriber data structures while retaining 1-1 access mapping, thereby supporting both data insights and distinct subscriber counts for business users while they are each synthesized independent of each other in a manner that best suits the respective processing needs.

Another feature of the disclosed system and method for real time distributed adaptive cube aggregation, heuristics based hierarchical clustering and anomaly detection framework for high volume streaming datasets may be to provide near real-time contextual dashboards for business users with seamless drill down capabilities, having the properties of an OLAP cube with the ability to zoom into and out of the data structure at various attributes such as traffic types, locations etc. Furthermore, descriptive analytics capabilities may be provided to business users synthesizing information such as count of subscribers, their collective behavioral insights, comparison with the entire global subscriber population alongside exporting actual subscribers contributing to that behavior of interest. Organizing and structuring real time information as it is incoming may yield discovery of hidden data clusters and other qualitative insights in streaming datasets by leveraging on efficient heuristics-based numerical techniques, and further empowering business users to understand real time dynamics of their data offering by providing insights on how clusters and/or data groups move over time within a given period of time. Hence, business users may be notified in advance of and/or during detection of anomalies in data usage trends for certain clusters or segments, which may help facilitate further pursuit of their analysis by providing access to actual subscribers who belong to the datasets that possess and/or may be responsible for such anomalies. Such anomalies and the detection thereof may have overall network benefits such as security, stability, performance, and load balancing.

These and other features of the disclosed system and method for real time distributed adaptive cube aggregation, heuristics based hierarchical clustering and anomaly detection framework for high volume streaming datasets will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 7 is an illustration of an exemplary GUI of a real-time informational table of an exemplary user interface system of the disclosure;

Figure 1A:
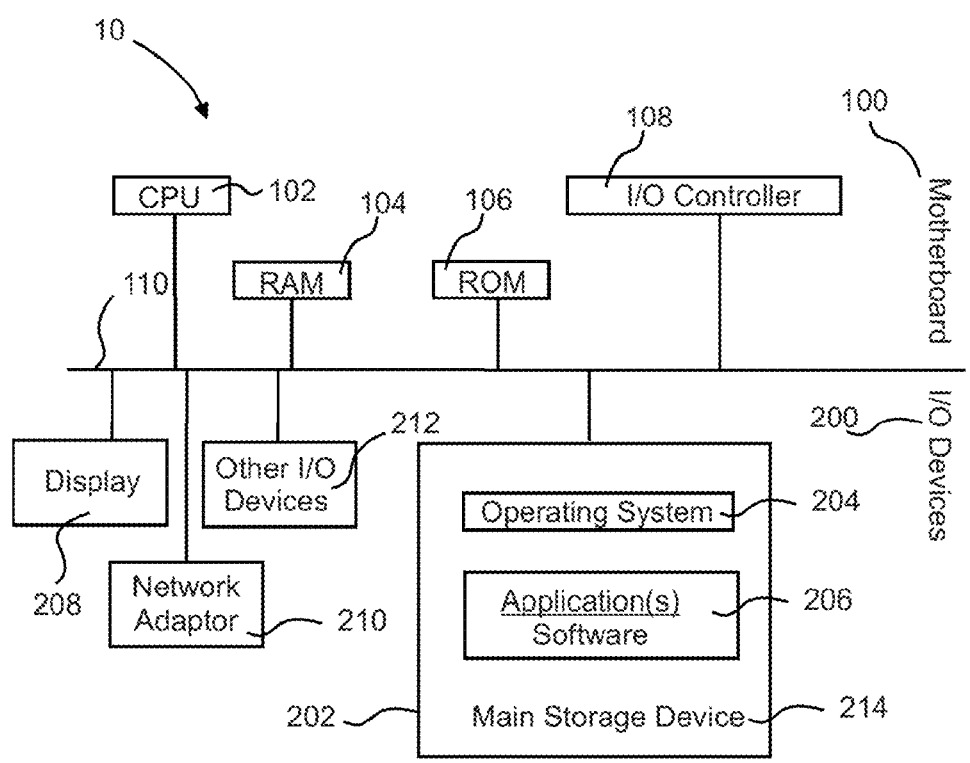
FIG. 1A is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-9, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples and are merely examples among other possible examples.

In order to understand the present disclosure, certain variables need to be defined.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices, solid-state drives (SSDs) and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1A, there is illustrated a block diagram of a computer system 10 that provides a suitable environment for implementing embodiments of the present disclosure. The computer architecture shown in FIG. 1A is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1A to be present to practice the present disclosure, as discussed below. Furthermore, the devices and subsystems may be interconnected in different configurations from that shown in FIG. 1A, or may be based on optical or gate arrays, or some combination of these elements that is capable of responding to and executing instructions or operations. The operation of a computer system such as that shown in FIG. 1A is readily known in the art and is not discussed in further detail in this application, so as not to overcomplicate the present discussion.

Figure 1B:
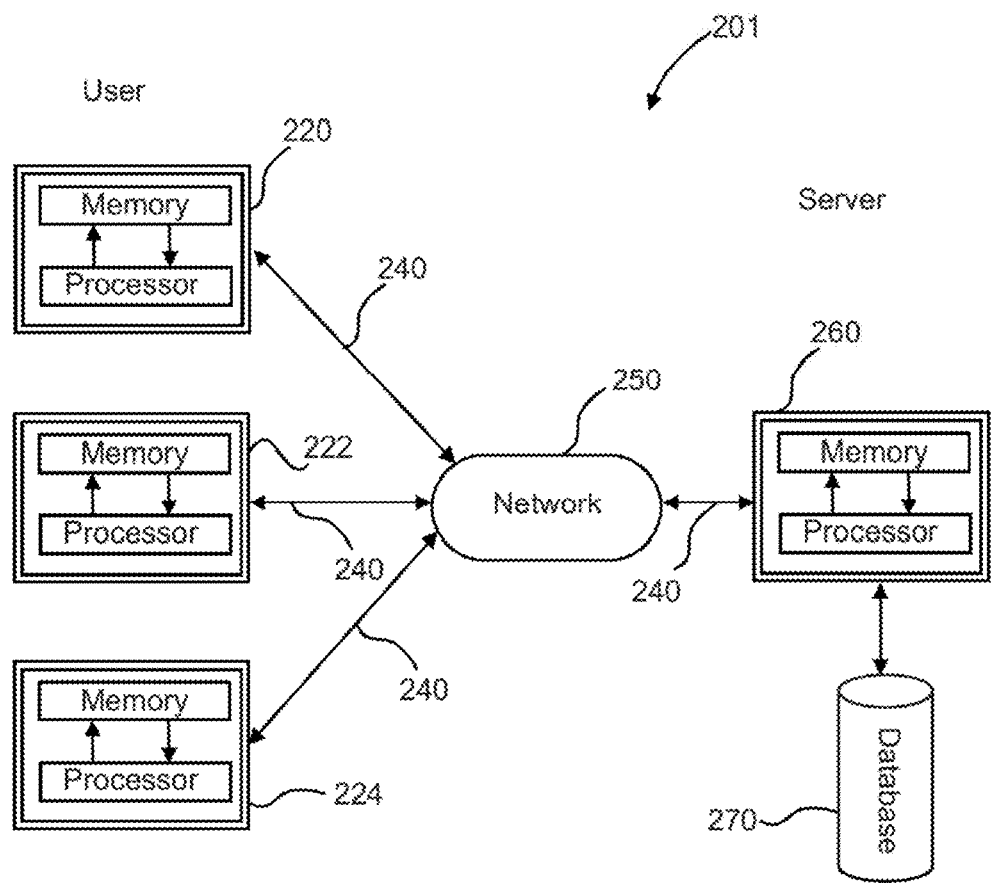
FIG. 1B is a block diagram of a communications system implemented by the computer system in FIG. 1A.

Referring now to FIG. 1B, there is illustrated a diagram depicting an exemplary communication system 201 in which concepts consistent with the present disclosure may be implemented. Examples of each element within the communication system 201 of FIG. 1B are broadly described above with respect to FIG. 1A. In particular, the server system 260 and user system 220 have attributes similar to computer system 10 of FIG. 1A and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1A. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1A). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communication system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, print and/or view multidimensional digital master image(s) 303 (see FIGS. 2, 3A, and 3B). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathways.

It is contemplated herein that RAM 104, main storage device 214, and database 270 may be referred to herein as storage device(s) or memory device(s).

Figure 2:
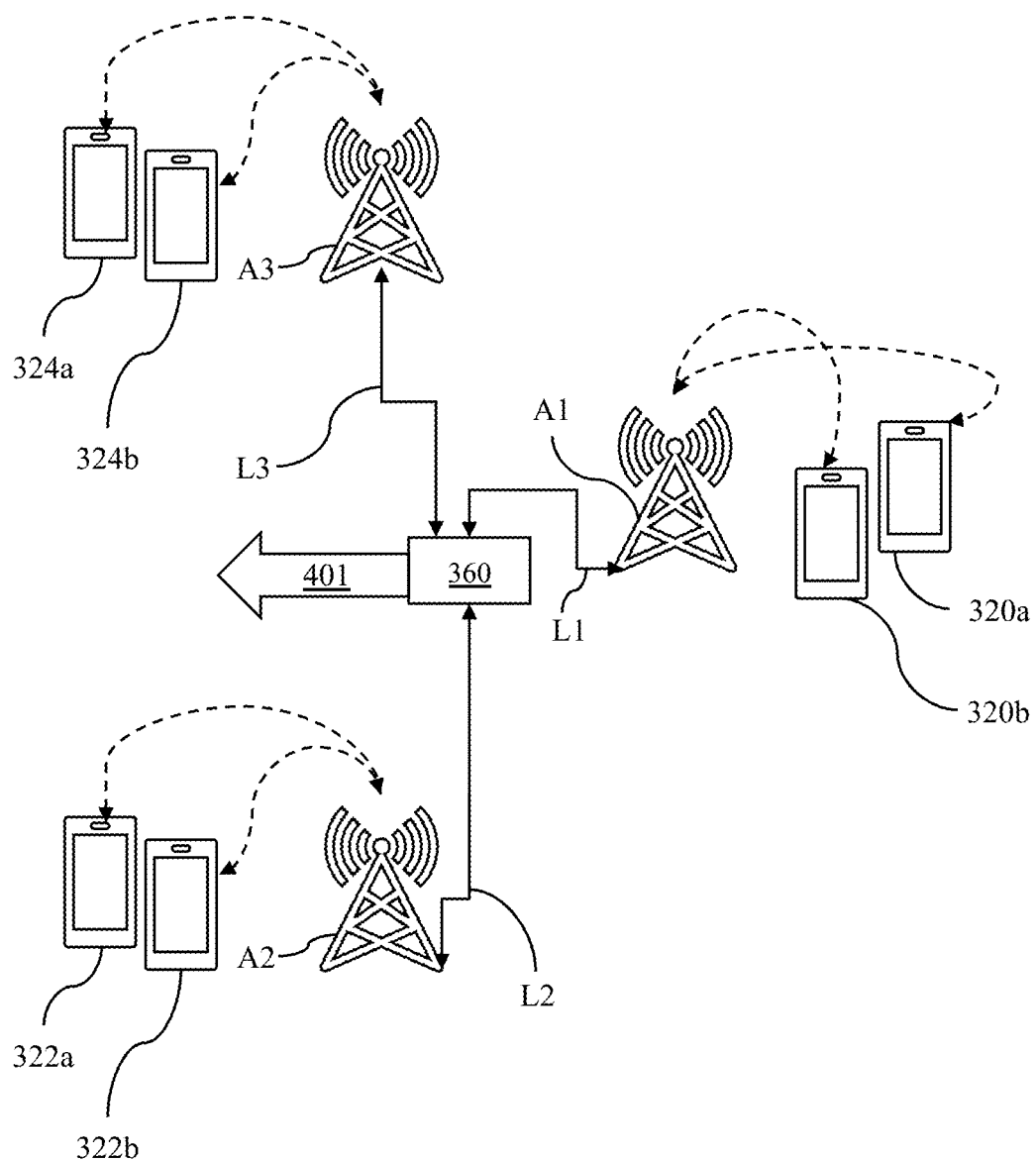
FIG. 2 is a block diagram illustrating various subscriber devices within an exemplary telecommunications network infrastructure.

Referring again now FIG. 2, by way of example, and not limitation, therein is illustrated various subscriber handsets within a telecom network, simplified to better illustrate and describe the activities thereof. Starting at the righthand side, subscriber devices 320*a*, 320*b* may be closest to or otherwise coordinated to receive and transmit data wirelessly to and from antenna A1. Clockwise, subscriber devices 322*a*, 322*b* may be closest to or otherwise coordinated to receive and transmit data wirelessly to and from antenna A2. Finally, subscriber devices 324*a*, 324*b* may be closest to or otherwise coordinated to receive and transmit data wirelessly to and from antenna A3. As may be noted and observed by those skilled in the art of telecom infrastructure design and implementation, each of subscriber devices 320*a-b*, 322*a-b*, and 324*a-b* are representative only and may in fact represent hundreds, thousands, or millions of subscriber devices, each connected to various antennas throughout a mobile telecommunications infrastructure. From each of antenna A1, antenna A2, and Antenna A3 may be telecommunications lines L1, L2, and L3, respectively, which may reach telecom computing machine 360 for receipt and intake/storage/processing by the company using its human and machine infrastructure. Also clear to those having ordinary skill in the art, such telecom computing machine 360 may represent one machine or, more likely, many machines at one or more locations. Furthermore, such a telecom computing machine 360 may be implemented in a cloud computing or distributive environment. Subsequent to receipt, data from each subscriber may arrive simultaneously or in quick succession as incoming data stream 401. Further processing of incoming data is described below.

Having described the basics of the structure and function of example methods of computing, networks, and mobile telecommunications, incoming data stream 401, and the exemplary methods and systems for use of incoming data stream 401 may be further illustrated and described below.

Figure 3A:
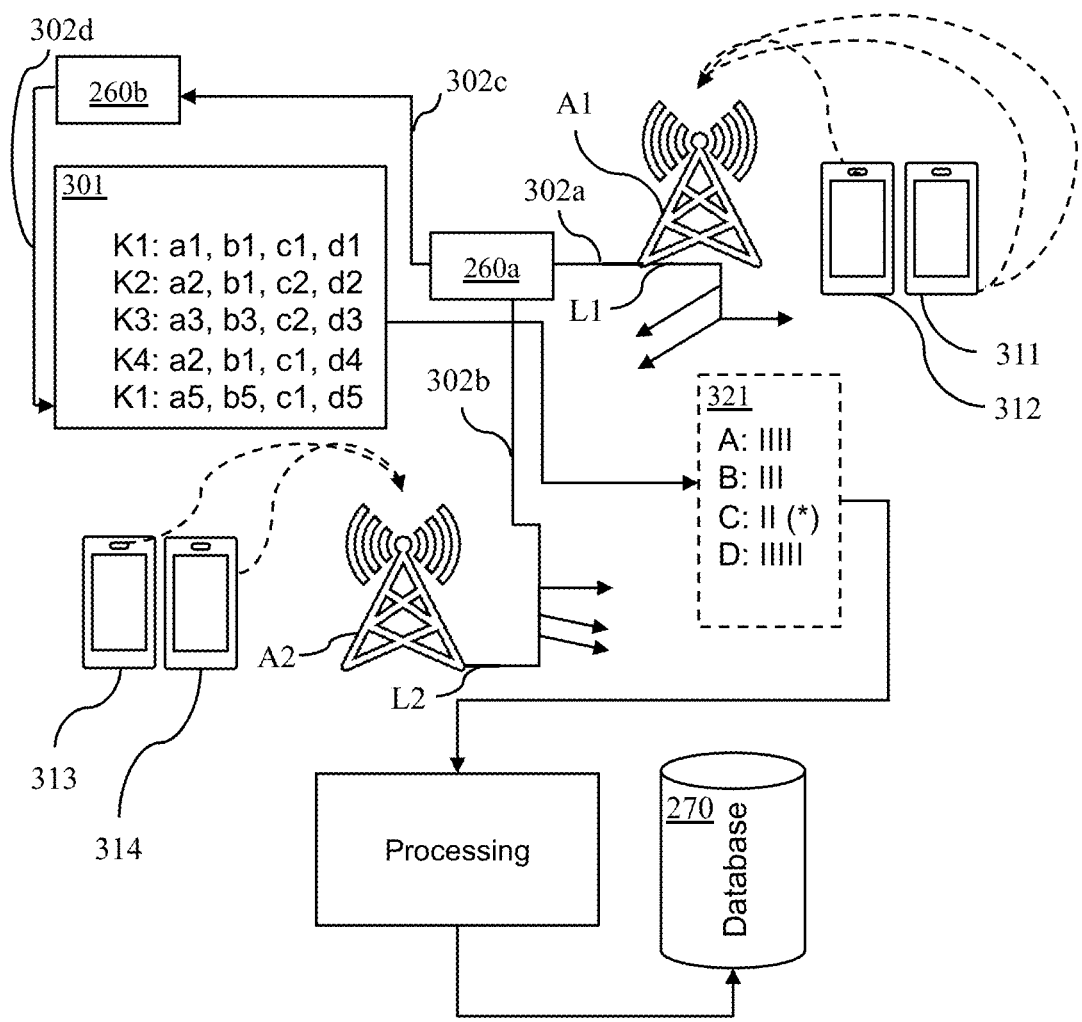
FIG. 3A is a block diagram of an exemplary telecommunications network infrastructure and initial steps in exemplary data processing network environment.

Now, turning to FIG. 3A, therein illustrated is a block chart having a flow diagram of an exemplary intake ingestion scheme in the exemplary telecommunication network infrastructure, described in a basic exemplary embodiment in FIG. 2. Basic components, which may or may not be required depending on the users/systems/subscribers/customers/content being monitored, studied, or stored, are exemplary only. A system and method according to the disclosure may be and likely is more complicated than may be illustrated in FIGS. 1A, 1B, 2, and 3A-B, and may involve multiple (or numerous) towers, user devices, networks, servers, users, the like, and/or combinations thereof. Beginning with various subscriber/user interaction(s) with various telecommunications infrastructure, first subscriber device 311, second subscriber device 312, third subscriber device 313, and fourth subscriber device 314 are therein illustrated. Dashed lines linking subscriber devices 311-314 may represent connections to each of telecommunication towers A1-A2, which may cause session information for each of subscriber devices 311-314 to be obtained via a machine on network 250. Each of subscriber devices 311-314 may interact (e.g., transmit and receive data) with telecommunication towers A1 and A2. Such telecommunication towers A1 and A2 may then interface with other devices on network 250 to achieve various tasks for subscribers using subscriber devices 311-314, such as placing/receiving a call, sending/receiving a text message, streaming video content for consumption by a subscriber, broadcasting video content from a subscriber to other devices, surfing the web, playing an online game, interacting with various social media platforms, the like and/or combinations thereof. As may be understood by those skilled in the art of telecommunications, each of these activities may be classified as a "session". Each session may have attributes relevant to a telecommunications company, in that they may be interested as to how subscribers use their network. The information sent/received by the subscriber may pass along transmission lines L1 and L2, which may be physical direct links between computing devices 10 on network 250, or may be mediated and indirect links to process incoming requests and deliver corresponding results to users/subscribers. Additionally, data relevant to the subscriber and to each subscriber session may be tracked and/or monitored by some or many device(s) on network 250 during Deep Packet Inspection (DPI), which may then be packaged, along potentially other data relevant to other subscribers, as a packet, by for instance server system 260, and then sent for storage on database 270. As is illustrated therein FIG. 3, first server link 302a and second server link 302b may carry transmission of the session information, which may be received by server system 260 (or first server 206a and second server 206b connected by third server link 302c), which may further package and/or process subscriber session relevant data into a data packet, then proceed to transmit to database 270 for storage and/or further processing and access. The packaging and processing process performed by various machines on server system 260 are covered in greater detail below. In receipt of session information relevant to subscriber devices 311-314, possibly via transmission from telecommunication towers A1-A2 to first server 260a via links L1-L2 and/or first server link 302a or second server link 302b then transmission via third server link 302c, second server 260b may proceed to "ingest" or facilitate the ingestion of session information for storage on database 270. As discussed throughout, data taken in during ingestion steps may be done via, for example, Deep Packet Inspection (DPI) at one or more machines throughout network 250. Example users IDs K1-K4 as illustrated in multisession tuple intake 301 may represent subscriber devices 311-314, respectively. Data, such as a1, a2, b1, b3 and the like may represent unique and/or discrete information with regard to an individual user session. For instance, by way of example and not limitation, "a1-a6" may represent a quality of service ranked A-F on a letter-grading scale where al is an A-grade quality of service, a2 is a B-grade of quality of service, and so on. Another such non-limiting example may be b1 representing the state of New York as a geographical region and b2 may indicate the state of Colorado, and so on. Other examples relevant to telecommunication subscribers may include, by way of example and not limitation, traffic type (e.g., social media, web browsing, audio streaming), volume (e.g., 300 KB), ping, latitude/longitude, tower information, the like and/or combinations thereof.

A processing step, which may be evaluation step 321, may count the number of discrete values in each of the tuples therein multisession tuple intake 301 to determine the category of information, or tuple, with the lowest number of discrete values. This evaluation and reorganization step may occur once upon data incoming or over several stages during various periods of data ingestion. As therein illustrated in evaluation step 321, a determination has been made that tuple C contains the fewest number of discrete values because only c1 and c2 are present in multisession tuple intake 301, meaning 2 discrete values. Other tuples, for example tuple A, tuple B, and tuple D, contain higher values of four, three, and five, respectively as therein illustrated in evaluation step 321 contained in FIG. 3A. Subsequent processing may then proceed to occur on various machines within network 250, the resulting byproducts of which may be saved to database 270 for later reference, analysis, reporting, or further processing.

Figure 3B:
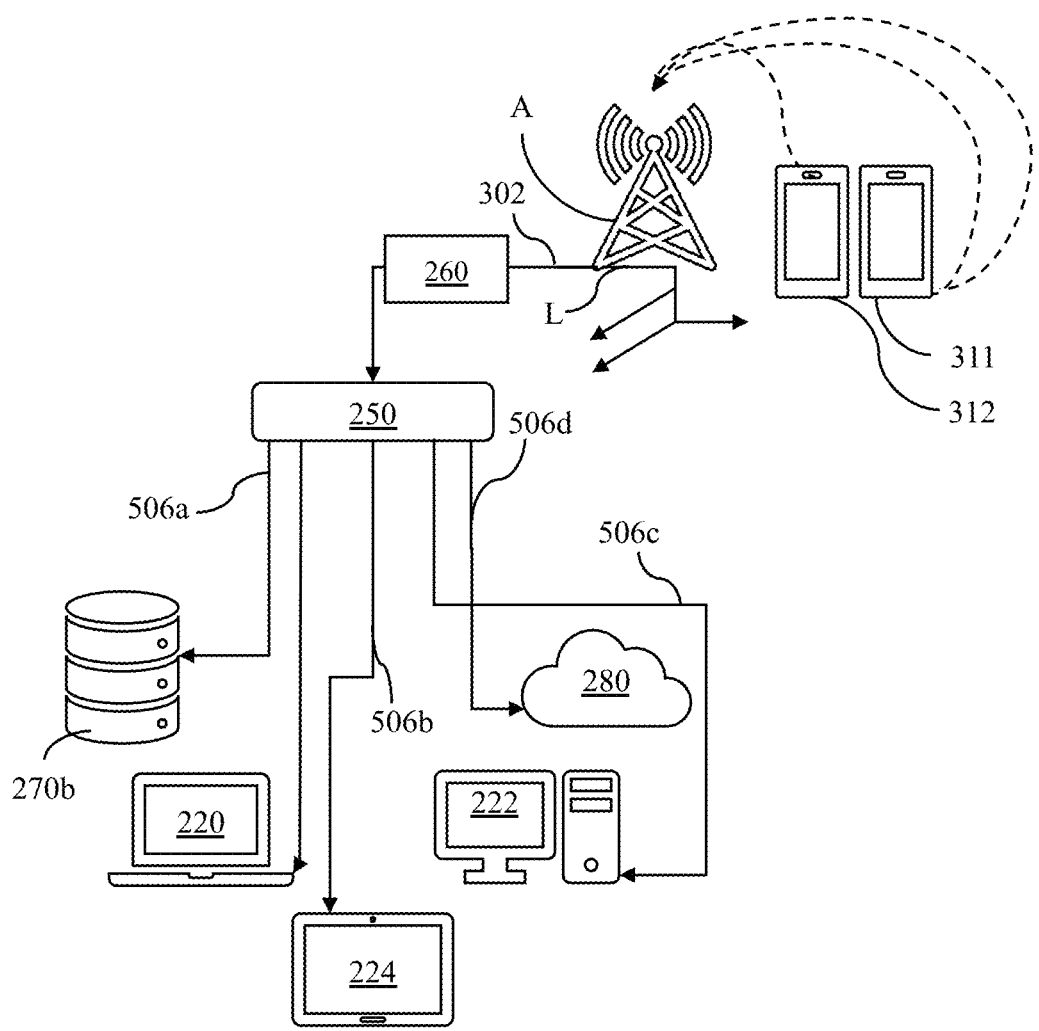
FIG. 3B is another block diagram of an exemplary telecommunications network infrastructure and an exemplary data processing network arrangement.

Now, turning to FIG. 3B, therein illustrated is a block chart having a flow diagram of an exemplary intake ingestion scheme in the exemplary telecommunication network infrastructure, described in a basic exemplary embodiment in FIGS. 2-3A. Basic components, which may or may not be required depending on the users/systems/subscribers/customers/content being monitored, studied, or stored, are exemplary only. A system and method according to the disclosure may be and likely is more complicated than may be illustrated in FIGS. 1A, 1B, 2, and 3A-B, and may involve multiple (or numerous) towers, user devices, networks, servers, users, the like, and/or combinations thereof. Beginning with various subscriber/user interaction(s) with various telecommunications infrastructure, first subscriber device 311 and second subscriber device 312 may each interact with antenna A, which may in turn transmit data and/or communicate via telecommunication line L with, for example, server system 260 and other devices on network 250, which may include exemplary database 270b, user systems 220, 222, 224, and virtual machine 280 via, e.g., network lines 506a-d. Obviously, a high volume system, such as those designed to benefit from the disclosed system and method for real time distributed adaptive cube aggregation, heuristics based hierarchical clustering and anomaly detection framework for high volume streaming datasets may be much more complicated than the elementary network examples provided herein, and may feature many hundreds or even millions of such exemplary devices as illustrated herein, and be connected via means known by those having ordinary skill in the art.

Figure 4:
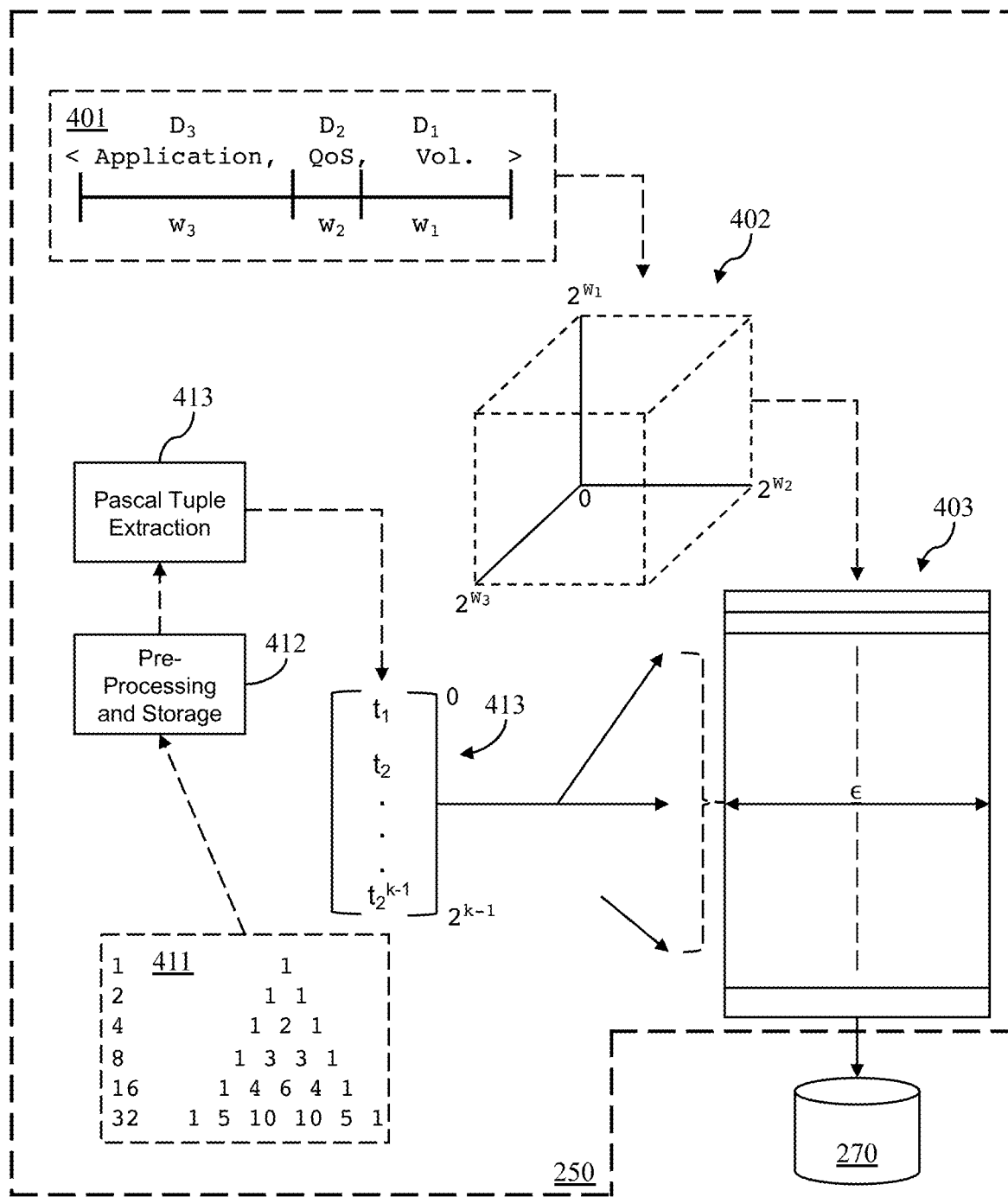
FIG. 4 is a block diagram illustrating exemplary initial data-transformational steps in a data ingestion system and corresponding processing method.

Turning now to FIG. 4, therein illustrated is a block diagram showing exemplary initial data-transformational steps in a data ingestion system and corresponding processing method of the disclosed system and method for real time distributed adaptive cube aggregation, heuristics based hierarchical clustering and anomaly detection framework for high volume streaming datasets.

First, it may in fact be important to those having ordinary skill in the art to be provided with a further understanding of basic incoming data organizational principals, such that an exemplary method of intake can be transformed using the systems and methods of the disclosure. It is well understood by those having ordinary skill in the art that saving space early in this process and remaining mindful of the principals of organization during processing and storage may cast benefits deep into a system's processing needs, reliability, and speed. One such example method of inspection and initial transformation of data may be segregating arriving data into different grades on the fly. For example, 30 records may each be encoded as 64-bit numbers with baseline storage of 30×64=1920. If each record, upon (initial) processing/inspection is recognized to contain volatile data, semi-volatile data, and non-volatile data, each of the 30 records may be parsed and data management systems that encode for such data along a volatility spectrum may be able to encode for an efficient strategy to track each category independently, based on how often the values are expected to change. In such a 30-record example, each of the records my have one distinct non-volatile attribute value (e.g., userID), there may be only 3 distinct semi-volatile attribute values (e.g., location, tower, etc.) across all records of the incoming stream over a short period, and 30 distinct volatile values across the 30-record example. By not recording repetitive data, such as non-volatile and semi-volatile, and by encoding only unique values, a nearly 70% reduction in storage/transmission volume may be achieved. Further processing techniques can be employed during processing to accommodate new unique data as it arrives, while continuing to ignore the redundancy. An optimal data layout technique may occur where the counters start small and gradually widen to accommodate increases in values they must hold. This may be done to optimize the efficiency of numerical operations like bit shifts and additions, as known to those having ordinary skill in the art. At entry, the "bins" used to accumulate user identified data, such as duration, volume and counts may be sized at 4, 5 and 3 bytes respectively yielding a 12-byte construct. This may be sufficient to hold data at ingestion because the actual values themselves are much smaller at this stage while they grow into larger values as they ascend to subsequent stages where they are added upon with more and more partials. So, for example, at first stage of collection upon assessing a range of values, a call may be taken to widen the bins for volume and count while duration is retained at 4 bytes. An internal algorithm can then compute how best to accommodate increases on individual dimensions and package them into a larger word on nibble multiple, as will be observed from a full understanding of the disclosed system and method for real time distributed adaptive cube aggregation, heuristics based hierarchical clustering and anomaly detection framework for high volume streaming datasets.

Having formed a better understanding of the machines and computing techniques to process incoming user data at intake, certain data structures may then be employed, as illustrated in FIG. 4. Generally, the steps, machines, and processes illustrated therein FIG. 4 may occur at various steps, on various machines, and through various processes which may be contained or understood to be contained within network 250. FIG. 4 may be understood by those having ordinary skill in the art as a hypercube synthesis and storage using flattened array and numerical techniques. Given that each user may be understood as a plurality of attributes, each attribute having a category and a number/value assigned, each user's data may be understood and in fact assembled into a hypercube having axes/dimensions according to each attribute category (e.g., traffic type, location, age on network, device IMEI) and values which relate to such dimensions. By structuring and understanding users in such a way, in any given subscriber base, there may be different types of structured records each containing data for a subset of dimensions from an identified master set of dimensions and based on business configurations, and a single record may aggregate into multiple cubes each configured for a subset of dimensions from the master set of dimensions. Pre-synthesized master dataset 411, which may contain all pascal-tuple bitmasks for aggregating incoming user data into any subset of dimensions from the incoming record may then be processed and stored at pascal bitmask assembly phase 412, and subsequently extracted in pascal tuple extraction phase 413, such that tuples may be used to decide the exact locations of a cube into which attributes from the current record gets aggregated. In the example illustrated in FIG. 4, record 401 may contain information about a single user session, which may include (along with other information) session volume information (dimension 1), session quality of service information (dimension 2), and session application information (dimension 3). Therefore, a cube having dimensions (D1, D2, D3) and dimension widths (w1, w2, w3) bits respectively may have a flattened sparse array of size $2^{w1+2+3}$, which may be thought of as words where each word may be of size 'e' bytes and can be used to represent an OLAP cube both logically and physically. Candidate tuple 413 may be extracted from incoming record and added bitwise (or freshly) as part of each iteration with each of the candidate pascal bitmap masks. In addition, or alternatively, the numerical equivalent of the resultant tuple obtained by interpreting the bits as a whole number may be used as a direct index into the flattened cube array into which the partials can be added.

Figure 5:
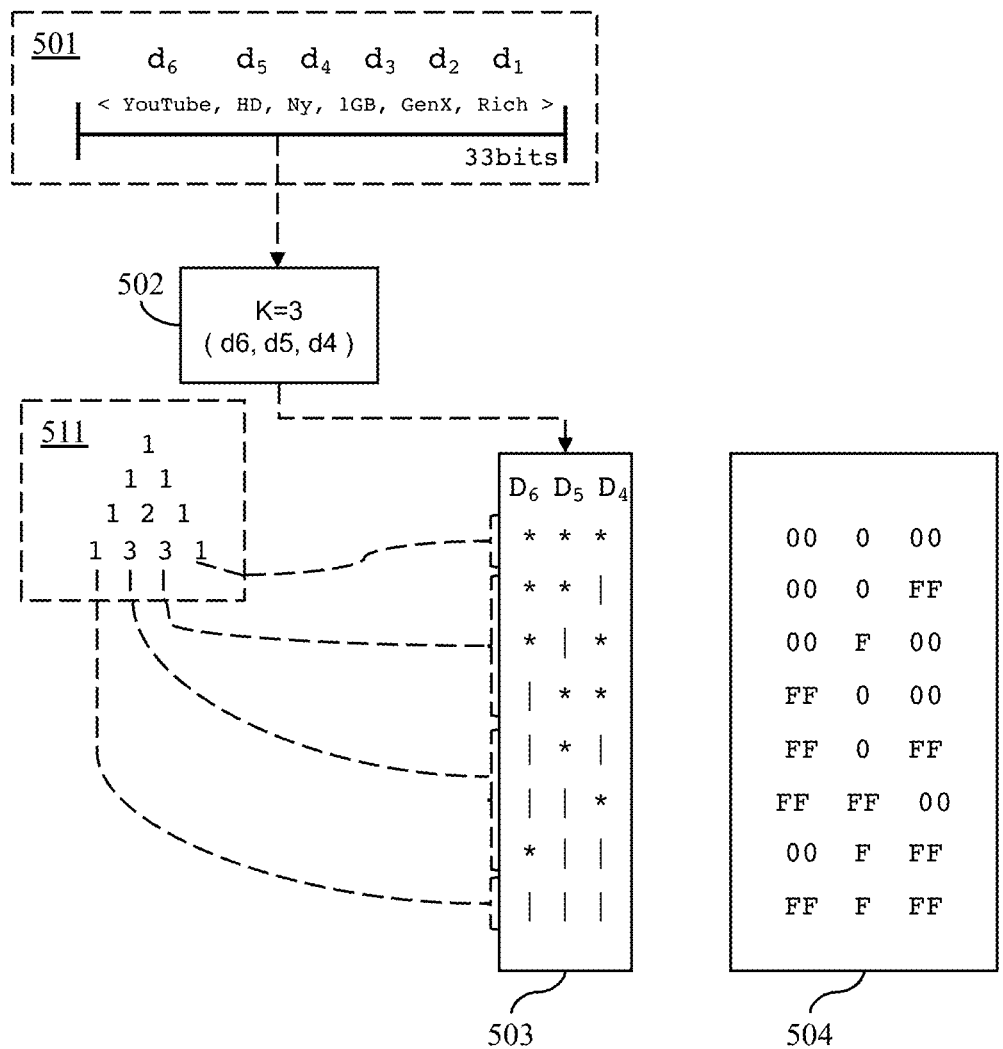
FIG. 5 is a block diagram illustrating exemplary intermediate data-transformational steps in a data ingestion system and corresponding processing method.

Turning now to FIG. 5, therein illustrated is a block diagram illustrating exemplary intermediate data-transformational steps in a data ingestion system and corresponding processing method of the disclosed system and method for real time distributed adaptive cube aggregation, heuristics based hierarchical clustering and anomaly detection framework for high volume streaming datasets. As is illustrated in FIG. 4, principals of pascal tuple formation from hypercube formations of user data may be important to the generation and storage of data in such an arrangement that can be later employed to make real time evaluations of such high-volume data. Exemplary incoming record 501 may arrive at some machine as illustrated in FIGS. 1-3B. Such exemplary incoming record 501 may represent a single session of a single user on a telecommunications network. In a potentially preferred embodiment of this intermediate step, a pascal triangle may be constructed having a height of D+1, or exceeding dimensional analysis in height by one. Then, for each pascal row, $P_R$, "L" pascal lanes may be generated, where "L" is the breadth of any row $P_R$ measured in number of elements. Next, an array of size $2^R$ elements may be constructed having values of [0, $2^R$) and their base binary representation. Each pascal lane can then be deemed to symbolize the combination for a specific number of dimensions currently turned on, which is the number of elements behind it on a row, which may be considered the lane live dimension count at any given point in time. Next, pascal lanes $P_{R,0}$ to $P_{R,B}$ can be constructed by selecting those elements from an array that contain live lane dimensions counts, and further steps may be deployed to investigate and/or query data held and/or stored in such a formulation. In an example embodiment of this intermediate step using simplified exemplary incoming data, a user may be using the YOUTUBE® application (d6), streaming HD video (d5), in New York (d4), consuming approx. 1 GB (d3), may be in the GenX generation (d2), and may be considered "rich" (d1). Looking at only the first 3 dimensions (d6, d5, 54) as may be business decision 502, efficiently generated pascal tuple bitmask formation 511 may be utilized to form session pascal tuple 503 and/or bitwise layout 504 having the dimensions as indicated. This may be due to a business user selection of traffic type (and quality) in a specific region (New York). As may be observed, then, only data received upon the request needs to be inspected and/or analyzed, then as these pascal tuples are assembled together, holistic observations about network conditions can be observed on a large scale, without losing resolution down to a single user. Given that such information as annual income or demographic information may be both static (non-volatile) and irrelevant to this request, no resources are dedicated to inspecting/analyzing this information of exemplary business decision 502.

Having described some intermediate steps to organize incoming DPI data to enable quicker access/analysis, further steps may be performed upon such organized data in certain potentially preferred embodiments of the disclosed system and method for real time distributed adaptive cube aggregation, heuristics based hierarchical clustering and anomaly detection framework for high volume streaming datasets. In one such potentially preferred embodiment, a bitmask overlay on pascal lanes may be performed to obtain a plurality of direct access pointers so that the data therein may be accessed directly, in real-time, and on demand. Furthermore, given the speed by which this data may be assembled, aggregated, and accessed, numerous new uses for the underlying data may be uncovered. A first exemplary step of such a process may be to list all dimensions and for each dimension, list down the domain set and determine dimension width "W" in bits using the exemplary formula [Log {(number of element sin domain set)+1}$_2$]. Then, for each dimension di of width $w_i$, the relative bitmask $bm_i$ can be generated as $(2^{wi}-4)$ in base 2 encoding. Next, a selection may be made among those dimensions having data, in order to perform an analysis of the data along the selected dimensions, and those same selected dimensions may be placed in an order. Then, a shift vector $S_D$ may be determined and the bitmask vector $BM_D$ may be computed for the candidate dimensions. For the candidate pascal row with "D" dimensions, each pascal lane may be picked and a transformation may be applied, where, for instance * may be replaced with a zero vector of width $w_i$ for dimension $d_i$ and 1 may be replaced with $BM_i$ for dimension $d_i$. Finally, data may be formatted as $[2^{\Sigma_{j=1}^{j=k} w_j}]*[e]$ bytes of memory as a direct accessible byte-buffer having "e" bytes records and $2^{\Sigma_{j=1}^{j=k} w_j}$ addresses. Assuming an example having 6 dimensions {$d_1$, $d_2$, $d_3$, $d_4$, $d_5$, $d_6$}, and each dimension having value numerosity of 10, 6, 50, 212, 11, and 200, respectively, an example of such processing can be used to further exemplify this process. Each dimension would then correspond to 4 bits, 3 bits, 6 bits, 8 bits, 4 bits, and 8 bits, respectively. The relative bitmasks {$bm_1$, $bm_2$, etc.} may then be generated as {0xF, 0x7, 0x3F, 0xFF, 0xF, 0xFF}. If candidate dimensions of {$d_1$, $d_2$, $d_5$} are then selected, $S_D$: $S_1$, $S_2$, $S_3$ (where the third dimension is $d_5$) yields {7, 4, 0}. Computing the bitmask vector $BM_D$ can be accomplished by {0xF<<7, 0x7<<4, 0xF<<0} and simplifying to 0x780, 0x70, 0xF. Each lane can then be assembled in order to determine subscriber volumes (and determine/export a list of subscribers) for which meet certain circumstances, according to the dimensions chosen, and an appropriately-sized corresponding buffer can be created by simply calculating $2^{wd1+wd2+wd5}$ which yields 2048 8-byte words or 16,384 bytes having 2048 addresses.

Figure 6:
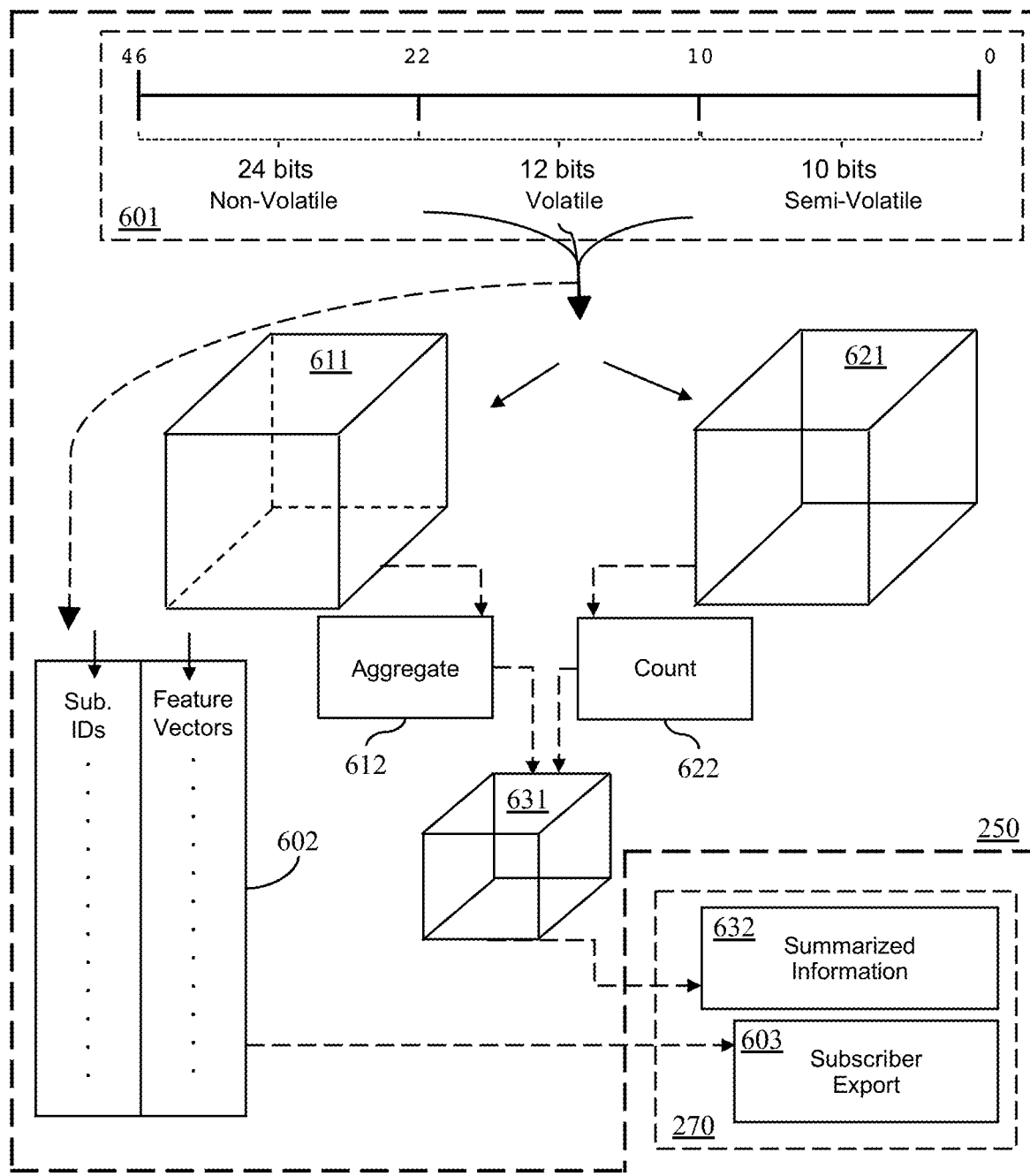
FIG. 6 is a block diagram illustrating exemplary final data-transformational steps in a data ingestion system and corresponding processing method.

Now, turning to FIG. 6, illustrated therein is a block diagram illustrating exemplary final data-transformational steps in the data ingestion system and corresponding processing method of the disclosed system and method for real time distributed adaptive cube aggregation, heuristics based hierarchical clustering and anomaly detection framework for high volume streaming datasets, as it may be understood by those having ordinary skill in the art to achieve the benefits described herein. These steps may be further recognized by those having ordinary skill in the art as those which may be relevant steps in servicing a business user request for insights. As illustrated, such steps may be performed within/on machines of and/or connected to network 250. As illustrated, business query 601 may, for example, be encoded as a 46-digit number with 24 bits representing non-volatile attributes, 12 bits representing volatile attributes and 10 attributes representing semi-volatile attributes. This may be assembled through the steps outlined above in order to obtain relevant dimensions and candidate attribute values using a catalogue of global and/or network relevant hypercube(s) 611, distinct customer hypercubes 621 and their flattened construct counterparts 602 over multiple business-configured cube dimensions anchored by, for example, timestamps that may represent an interval, such as an hour of the day. A numerical translator may then be used to transform the 46-bit input query into appropriate access-keys for. The relevant global and/or network relevant hypercube(s) 611 and distinct customer hypercubes 621 for a given timestamp (in this example) reflecting user queries may then be subject to a UNION operation where global and/or network relevant hypercube(s) 611 are aggregated at aggregation step 612 (where values are aggregated for all possible combinations) and distinct customer hypercubes are counted to determine the distinct subscriber set for each of the possible combinations at counting step 622. Then, resultant OLAP cube 631 may be stored alongside flattened construct counterparts 602 and formatted to reflect user's input query that can be used to export subscribers (i.e., a subscriber list matching the business query) in an exemplary GUI. The numerical translator may be configured to accept a user query as a number, such as business query 601), determine various sub-query component vectors (such as volatile, semi-volatile and non-volatile), and then by proceeding with direct address indexing using a pure function on the sub-query component vectors.

As an overview of such a process of intake, pascal tuple formation, and subsequent analysis and event detection, an exemplary system and method for real time distributed adaptive cube aggregation, heuristics based hierarchical clustering and anomaly detection framework for high volume streaming datasets of the disclosure may also be described herein. In one example of the disclosed system and method for real time distributed adaptive cube aggregation, heuristics based hierarchical clustering and anomaly detection framework for high volume streaming datasets, 24 entry-level processes may each be hosted in memory as incoming data may be aggregated into geometric formations (e.g., hypercubes and their flattened counterparts) as it may relate to approximately 4M subscribers. Given such a high-volume subscriber base, roughly 1M records per second may be cumulatively aggregated into components and from there, streamed over ZMQ to one of 4 group-2 components comprising a global subscriber receiver, a high-volume global value receiver, and a subscriber specific value receiver. Data from 6 entry stages may then be channelized to one group-2 stage unit and so each of these units handles data belonging to 24M subscribers. Cube Synthesis may then proceed to occur using spray logic detailed below (e.g., a clustering technique) and the process itself may be performed completely in memory for low volume receipts whereas it may also include intermediate file backed staging for high volume and variants related to distinct subscriber values. The global cubes may then contain aggregate insights for various traffic types, the direct subscriber cubes and flattened records generated therefrom may then contain count(s) of distinct subscribers for cubes the global cubes, which may be synthesized independently of a global cube assembly, and the flattened records (i.e., flat files) may then contain actual subscribers laid down in an export friendly format to be serviced in response to subscriber export requests. Finally, concluding this exemplary process at stage 3, data arriving from 4 group-2 stage units may in turn unite into a single unit with data belonging to all 96M subscribers made available under a single global cube (or cube group) comprising of one global cube (for insights), one distinct subscriber cube (for distinct subscriber counts) and one flattened record to support subscriber exports.

Specifically related to the clustering in the above-described overall process, clusters themselves may be determined using a divisive top-down approach with business guidance such as clustering around traffic types, clustering around nature of browsing, clustering around data browsing patterns, the like and/or combinations thereof, where collective feature vectors may be maintained as bitmaps, numerical multiples of profile values as group trait, and counts of subscribers as pivots. Then, the clusters may be split from there on so that the same number of bits set in each of the cluster bitmaps can be roughly maintained, and the same numerical multiple of profile values may be referred to as a trait of the group and a include a count of subscribers having that trait. Overall, an exemplarily methodology for clustering can be considered to be business guidance or rule assisted as real-world insights can be used as a baseline to form clusters and then others may be improvised using numerical techniques for better cohesion. Deviations in computed values for same metrics for a reference dataset over different timeframes alongside simple arithmetic measures like deviation from mean values, variance in ranks of a particular reference site may then be used to assess anomalies within the dataset. Such anomalies in usage patterns may be beneficial to be detected for any numerous and varieties of reasons, but may only be detectable if observance is given to real time data and analyses are performed quickly upon such data to make anomaly determination. Therefore, a rate to analyze data in a given cluster may be more important than the accuracy and/or precision by which the data are gathered. By hierarchical clustering on a hypercube having individual-subscriber resolution (or series of hypercubes) using simple sorting, these types of quick business/network performance observations can be easily detected. At a first step, a certain feature and/or characteristic of user behavior may be extracted using a function to list and/or emit the top, for example, three traits of every subscriber in groups of subscribers may be requested. These top three traits may be ordered by a business needed attribute at a given period of time. Then, a rule for each given trait, of the three, may be established to set a threshold value for further inspection or the subscribers within any subset may be rank ordered to their conformance with these three traits and/or values. Subscribers having high values according to the specific traits may then appear earlier and/or toward the head of the data and therefore be more easily identified when performing analysis. Once sorting begins, additional subscriber information and data collected may be entered and stored along a given set of "M" markers (m1, m2, etc.) with markers denoting the resolution of data among the subscriber base and ultimate number of clusters to be generated from the corresponding data. Within each of the M clusters, a determination can be made for the type of counters and profile attribute values with the greatest cardinality and/or greatest diversity. The sub file for each M cluster may be set only on the counter with the greatest cardinality (or diversity) and the file may be named $F_{CK}$ (f1, f2, etc.). $F_{CK}$ in this example may denote the file for the $K^{th}$ cluster sorted on the counter and $F_{PK}$ may denote the file for the $K^{th}$ cluster sorted on profile attribute. This may then be repeated for every $K^{th}$ cluster and corresponding profile attribute. Then, one volume (or duration) may be used as an anchor a guidance value for aggregating anchor values may be a sub cluster. An array sum computation from the beginning of (each) file may then be ran and a place marker for every instance of a sum exceeding a pre-determined maximum. Next, a number of sub clusters may be arrived at for each seed file. For each combination of sub-clusters, an aggregate value corresponding to a pre-determined anchor (such as volume or duration). Then, upon return of only, for example, a third of the combination subclusters which are closest to the pre-determined anchor and/or a median aggregate anchor value may be analyzed to determine anomalies. This may be facilitated by using only basic compression and trend examination such as over a small duration on a limited number of subclusters and can detect such anomalies as, for example those which affect a specific location, those which affect a specific location during a specific time, or traffic types across various locations. Anomaly detection at traffic type level may be facilitated, for example, by measuring skew in traffic type over a duration, cumulative traffic volume for a traffic type, certain quality of service measurements/data at a specific location, etc. Such information may appear to a user in summarized information 632, as subscriber export 603, or via graphical user interfaces as illustrated and described in e.g., FIGS. 7-8.

Now, describing FIG. 7, illustrated therein is an exemplary GUI of a real-time informational table of an exemplary user interface system of the disclosed system and method for real time distributed adaptive cube aggregation, heuristics based hierarchical clustering and anomaly detection framework for high volume streaming datasets. Such an exemplary system and corresponding exemplary GUI may be utilized on an approximately 100M subscriber volume network with, for example, over 60B daily subscriber records incoming with a virtual machine having 24 ingestion engines, 4 group 2 stage units, and one final aggregator stage on a combined compute of 8×(8VCPU, 64 GB RAM, and 256 GB SSD storage). Using the techniques described herein, business users may be served seamlessly with analytics capabilities of any chosen hypercube having up to 5 dimensions within the potential choices of dimensions. Initial visibility using a real time dashboard may show, for example, net data utilization across various regions for all user sessions throughout a given day. Then, those regions may be identified which exceed their percentage utilization (or do not) and load balancing procedures may be better informed. Another potential dashboard may be illustrated therein FIG. 7. In overview GUI 700 as illustrated therein FIG. 7, real-time streaming insights may be rendered over a Cube with 3 user defined example dimensions—application type, speed class and region. Here, an example region of "Thana" has been selected therein dimensions field 703 (along with application type and speed class) and the current hour may be observed using period dropdown 702. Having made these user selections, a dimension for independent variable sorting may be selected from independent variable selection dropdown 711 and a dimension for dependent variable sorting may be selected from dependent variable selection dropdown 712. Once selections have been made chart 790 may be output having application types (independent variable) sorted into independent chart column 721 and speed classes across dependent chart row 722. Data showed thereon chart 790 may include data volume relevant to the specific row/column and subscriber volume relevant to the same. In such a visual representation as can be found in overview GUI 700, only the lead part of a 2d folded, 3d cube is visible to the end user. An example real time insight gained from such a visual representation may be the revelation that a combined YOUTUBE® data consumption exists of 16 Terabyte at Speed Class D by over 414K subscribers belonging to a specific region. Then, it can be possible to select for export the exact list of subscribers who exhibit that specific behavior from the same GUI. Other insights can be selected for drilldown to find comparable subscriber populations relevant to a such other insights. For this example, (YOUTUBE®, *) may drilldown and/or zoom out to reveal all speed classes for YOUTUBE® browsing subscribers while a (*,A) may yield all traffic types at speed class A.

Figure 8:
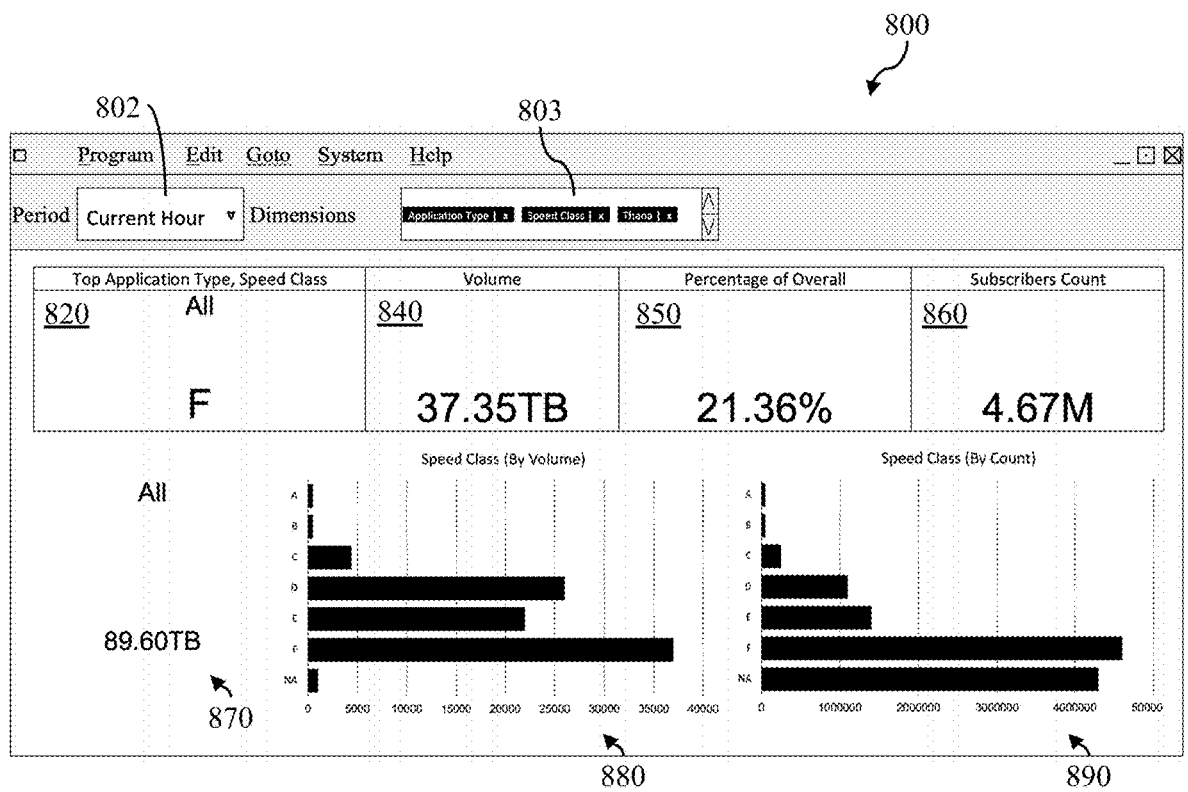
FIG. 8 is an illustration of an exemplary GUI of a real-time informational dashboard of the exemplary user interface system of the disclosure.

Turning to FIG. 8, provided therein is an illustration of an exemplary GUI of a real-time informational dashboard of the exemplary user interface system of the disclosed system and method for real time distributed adaptive cube aggregation, heuristics based hierarchical clustering and anomaly detection framework for high volume streaming datasets. In example diagnostic dashboard 800, again, a period may be selected, this time, by a user using observed period dropdown 802 and the dimensions selected by using dimensions field 803. Once having selected the period and dimensions, summary information may be provided in summary box 820. Here, it is revealed that the top application type is All and the top speed class at the moment is speed class F. The subcategory being drilled down into may then have volume information in volume box 840, percentage of overall volume in percentage box 850, and number of subscribers in this drilldown in subscriber count box 860. Then, summary information for the network may be provided in summary box 870, with charts for each speed class by volume and by subscriber count in speed class volume chart 880 and speed class by subscriber count chart 890, respectively.

Figure 9:
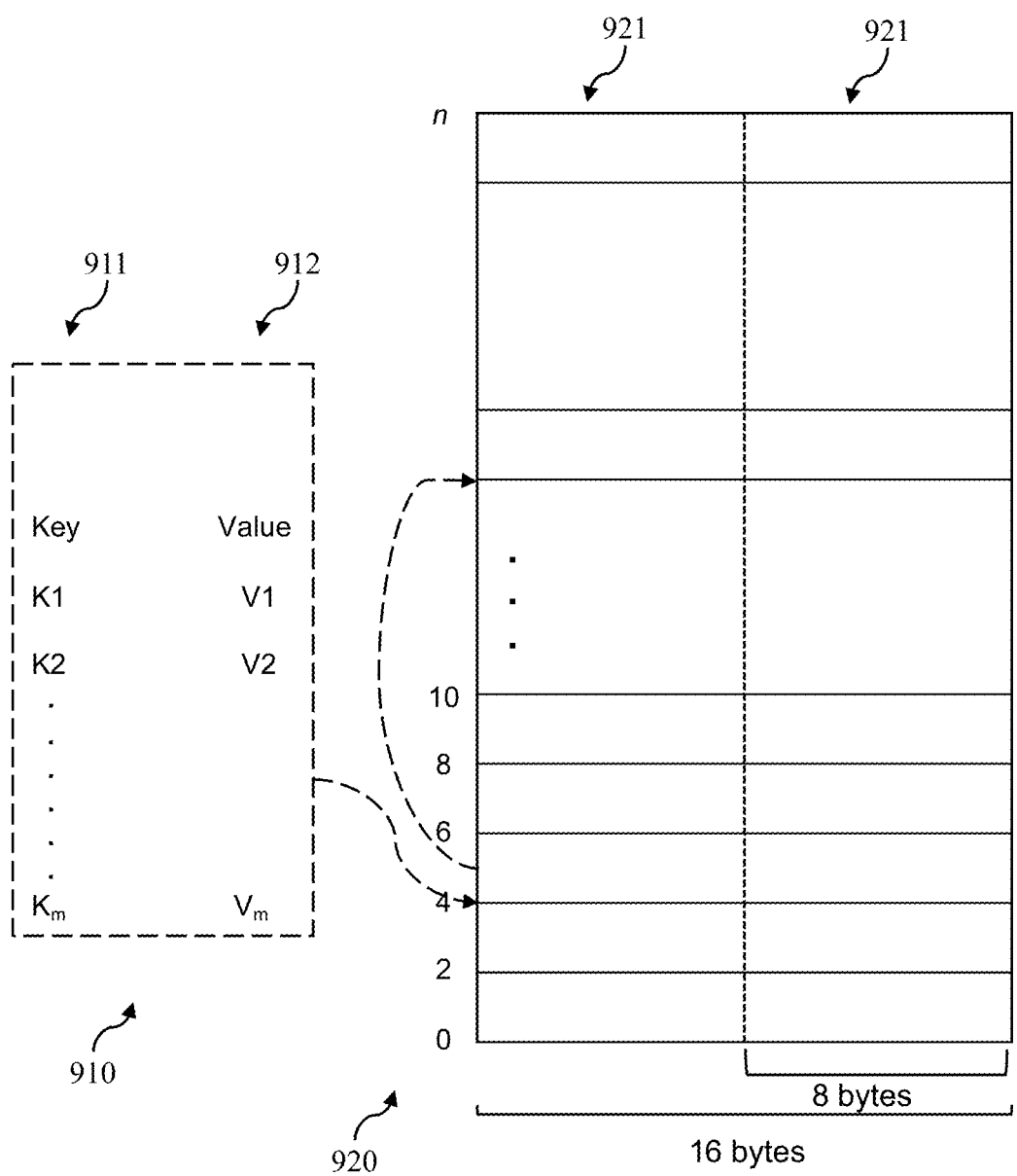
FIG. 9 is a block diagram illustrating in-memory formatting of session data upon ingestion as it is relevant to the disclosure.

Concluding with those systems, processes, and methods of cube synthesis, as they may be relevant to the system and method for real time distributed adaptive cube aggregation, heuristics based hierarchical clustering and anomaly detection framework for high volume streaming datasets of the disclosure, FIG. 9 illustrates in memory formatting of data relevant to the disclosure. Step 1 may include in-memory staging. There, in-memory array 920 may be formatted to hold 16-byte words interpreted as (36+28+4×16) bits. Such bits may be used to store attribute values 912 where each attribute may be a 12-bit or 16-bit value and the first 28 bits may be a pointer to the next value in case value-words are chained to support keys that have attributes exceeding a word. An in-memory map may then serve as an index for every key 911 with value as the address of the first word for the chain of value-words for that key. The in-memory buffers created in step 1 may then be periodically flushed to downstream receivers that store the values on disk as distinct subscriber related files in a cube or flattened cube data structure. The universe of candidate attribute values may then be encoded in a bitmap of length that equals the cardinality of universe 'C', and every key may be encoded as a byte-blurb that is exactly 32+C bits long (potentially rounded up to byte boundaries for better alignment in some possibly preferred embodiments) where an on-bit can denote that attribute value is held by any specific customer. The staged distinct subscriber files can then be sorted by key 911 (through simple comparison on first 32 bits for rows interpreted as 32+C bit words) using an external sort and a sorted-merge iterator created for the files. For every key 911 read from the sorted-merge iterator, a single C-bit bitmap can be obtained by performing bitwise OR operation of the C-bit bitmaps read from files holding values for that particular key 911, and then these bitmaps can be blown out into actual attribute values 912 by applying reverse transformation on the on-bit by way of picking the corresponding ordinal attribute from the universe (referred to in step 2) which can be spread across multiple dimensions. Finally, distinct subscriber files, organized into cubes can be serialized onto disk as files that contain N*(32+S) bits where S denotes the number of bits needed to encode a flattened distinct subscriber volume cube which equals 2 raised to the power of dimension widths in bits for candidate cube dimensions.

Having implemented the disclosed methods upon a system according to the disclosure, many benefits have been achieved that may be notable to those having ordinary skill in the art. First, incoming datasets can be segregated on the fly into various buckets and thereafter be available to an aggregation technique that best suits the corresponding data volumes and inherent traits. Thus by adapting to the nature of incoming data as it arrives, organizing data can be accomplished in an efficient manner by eliminating redundant information. Additionally, globally organized data can be provisioned separately from subscriber distinct data while retaining 1-1 access mapping between global organization and subscriber-level organization, thereby supporting both data insights and distinct subscriber counts for business users while they are each synthesized independent of each other in a manner that best suits the respective processing needs. Then, near real-time contextual dashboards can be provided for business users to enable seamless drill down capabilities and further providing descriptive analytics capabilities to business users synthesizing information such as count of subscribers, their collective behavioral insights, comparison with the entire population alongside exporting actual subscribers contributing to that behavior of interest. This may lead to discovery of otherwise hidden data clusters and other qualitative insights in streaming datasets by leveraging efficient heuristics based numerical techniques. Then, business users can better understand real-time dynamics of their network dynamics. These and other anomalies in data usage trends for certain clusters or segments may even facilitate better analyses by providing access to actual subscribers who belong to the datasets that possess anomalies (e.g., forensic investigation). This way, the engineering problem of providing summarized information at scale and on demand while preserving resolution down to the subscriber can be resolved to provide a useful tool to companies in receipt of large DPI volumes.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A method for aggregating an incoming data stream containing a telecommunication subscriber activity data at a computing device having a processor, a non-transitory computer readable medium, and a memory, the computing device capable of a deep packet inspection (DPI) during consumption by the computing device, the method comprising the steps of:
    establishing the incoming data stream to the computing device;
    parsing on-the-fly said DPI data on a per-subscriber basis based into a plurality of dimensions, said plurality of dimensions correspond to a plurality of subscriber session attributes and a plurality of values corresponding to said plurality of subscriber session attributes;
    separating on-the-fly a plurality of volatile datasets of said plurality of subscriber session attributes, a plurality of semi-volatile datasets of said plurality of subscriber session attributes, and a plurality of non-volatile datasets of said plurality of subscriber session attributes into a plurality of distinct memory bins for each plurality of datasets;
    expanding an at least one of said plurality of distinct memory bins when said at least one of said plurality of distinct memory bins is consumed;
    generating an in-memory hypercube having a plurality of hypercube dimensions each corresponding to said plurality of dimensions;
    numerically translating an input query into an access query for said in-memory hypercube, said input query comprising an at least one subscriber attribute; and
    returning a list of subscribers in response to said input query;
    wherein said plurality of subscriber session attributes comprise a download volume, an upload volume, a traffic type, a session duration, a geolocation, and a quality of service.

2. The method of claim 1, wherein said plurality of non-volatile datasets comprises a plurality of subscriber session attributes that do not change in relation to an individual subscriber over a 24-hour period.

3. The method of claim 1, wherein said plurality of semi-volatile datasets comprises a plurality of subscriber session attributes that change fewer than 5 times over a 24-hour period in relation to an individual subscriber.

4. The method of claim 1, wherein said plurality of volatile datasets comprises a plurality of subscriber session attributes that change greater than 5 times over a 24-hour period in relation to an individual subscriber.

5. The method of claim 1, wherein the input query is first encoded as a 46-digit number before being numerically translated.

6. The method of claim 5, wherein a second computing device is connected to said computing device via a network, said second computing device having a second processor, a second memory, and a display, and further comprising a step of providing a real-time graphical user interface to generate said input query.

7. The method of claim 6, further comprising the step of determining an acceptable range for said plurality of values for each of said plurality of subscriber session attributes.

8. The method of claim 7, further comprising alerting a user when an at least one of said plurality of values exceeds said acceptable range.

9. The method of claim 1, further comprising exporting said list of subscribers, said plurality of subscriber session attributes corresponding to said list of subscribers, and said plurality of values corresponding to said list of subscribers to a database.

10. A computer system for aggregating an incoming data stream, the computer system comprising:
    a memory device for storing a plurality of data from the incoming data stream;
    a non-transitory computer readable medium;
    a network connection capable of receiving the incoming data stream; and
    a processor in communication with said memory device, said non-transitory computer readable medium, and said network connection, said processor configured to perform a deep packet inspection (DPI) and further configured to:
    establish the incoming data stream to the computing system;
    parse on-the-fly said DPI data on a per-subscriber basis based into a plurality of dimensions, said plurality of dimensions correspond to a plurality of subscriber session attributes and a plurality of values corresponding to said plurality of subscriber session attributes;
    separate on-the-fly a plurality of volatile datasets of said plurality of subscriber session attributes, a plurality of semi-volatile datasets of said plurality of subscriber session attributes, and a plurality of non-volatile datasets of said plurality of subscriber session attributes into a plurality of distinct memory bins for each plurality of datasets;
    expand an at least one of said plurality of distinct memory bins when said at least one of said plurality of distinct memory bins is consumed;
    generate an in-memory hypercube having a plurality of hypercube dimensions each corresponding to said plurality of dimensions;
    numerically translate an input query into an access query for said in-memory hypercube, said input query comprising an at least one subscriber attribute; and
    return a list of subscribers in response to said input query;
    wherein said plurality of subscriber session attributes comprise a download volume, an upload volume, a traffic type, a session duration, a geolocation, and a quality of service.

11. The system of claim 10, wherein said plurality of non-volatile datasets comprises a plurality of subscriber session attributes that do not change in relation to an individual subscriber over a 24-hour period.

12. The system of claim 11, wherein said plurality of semi-volatile datasets comprises a plurality of subscriber session attributes that change fewer than 5 times over a 24-hour period in relation to an individual subscriber.

13. The system of claim 12, wherein said plurality of volatile datasets comprises a plurality of subscriber session attributes that change greater than 5 times over a 24-hour period in relation to an individual subscriber.

14. The system of claim 10, wherein the input query is first encoded as a 46-digit number before being numerically translated.

15. The system of claim 14, wherein a second computing device is connected to said computing device via a network, said second computing device having a second processor, a second memory, and a display, and further comprising a step of providing a real-time graphical user interface to generate said input query.

16. The system of claim 15, wherein the computer system is further configured to determine an acceptable range for said plurality of values for each of said plurality of subscriber session attributes.

17. The system of claim 16, wherein the computer system is further configured to alert a user when an at least one of said plurality of values exceeds said acceptable range.

18. The system of claim 1, wherein the computer system is further configured to export said list of subscribers, said plurality of subscriber session attributes corresponding to said list of subscribers, and said plurality of values corresponding to said list of subscribers to a database.

* * * * *